(12) United States Patent
Lucco

(10) Patent No.: US 8,147,734 B1
(45) Date of Patent: Apr. 3, 2012

(54) METHOD FOR CREATING ORNAMENTAL STRUCTURES

(76) Inventor: Anthony J. Lucco, Menlo Park, CA (US)

( * ) Notice: Subject to any disclaimer, the term of this patent is extended or adjusted under 35 U.S.C. 154(b) by 0 days.

(21) Appl. No.: 13/177,481

(22) Filed: Jul. 6, 2011

(51) Int. Cl.
*B29C 67/20* (2006.01)
(52) U.S. Cl. .......................... 264/46.6; 264/500; 264/512
(58) Field of Classification Search .................. 264/46.6, 264/500, 512
See application file for complete search history.

(56) References Cited

U.S. PATENT DOCUMENTS 4,678,157 A * 7/1987 Fondiller ..................... 249/65
8,071,175 B2 * 12/2011 Baik ............................ 427/402

* cited by examiner

*Primary Examiner* — Christina Johnson
*Assistant Examiner* — Galen Hauth
(74) *Attorney, Agent, or Firm* — Ray K. Shahani, Esq.

(57) ABSTRACT

A method to create a hollow ornamental structure utilizing an inflatable balloon, the ornamental structure features an inner shell layer created by inflating the inflatable balloon to the predetermined size and shape with a filler material, allowing said filler material to harden and pouring out access filler material when a desirable thickness of hardened filler material is attained; and a textured and colored outer shell layer. The basic form of the hollow ornamental structure can be further modified to form a container such as a vase and other decorative pieces.

7 Claims, 4 Drawing Sheets

METHOD FOR CREATING ORNAMENTAL STRUCTURES

RELATED APPLICATIONS

None.

FIELD OF THE INVENTION

The present invention relates to a method for creating a spherically shaped ornamental structure, and more particularly to a method of utilizing commercial balloons to creat such decorative pieces.

BACKGROUND OF THE INVENTION

It is common to utilize balloons in creating ornamental and art pieces. Two typical examples are balloon modeling or twisting and paper-mache application on balloons.

Paper-mache, is a composite material consisting of paper pieces or pulp, sometimes reinforced with textiles, bound with an adhesive, such as glue, starch, or wallpaper paste. It is a common technique to apply layers of paper-mache on an inflated balloon to create a spherical shell. The balloon is then punctured and paint or other coating materials will be applied on the shell for decoration and protection purposes. Sometimes, the paper-mache shells will be further decorated. Paper-mache is used on carnival masks, art decorations, sculptures and other forms of decoration. One disadvantage of paper-mache is that the end product is usually fragile and decomposable due to the raw materials such as paper, textiles and rubber glue. Also, the art pieces are usually not water proof unless a very heavy coating is applied. Also, using paper-mache to create a shell for art pieces are time consuming as users have to apply multiple layers of thin materials until a certain thickness is attained.

The present invention is a method to create an art decoration piece by filling up a balloon with undecomposable foam material. Coating, molding techniques will then be applied to create the desirable texture and shape of the final art piece.

ADVANTAGES AND SUMMARY OF INVENTION

One object and advantage of the present invention is to provide a undecomposable, water proof art piece in balloon shape.

Another object and advantage of the present invention is to provide an easier and less time consuming method to create a shell in balloon shape.

Another object and advantage of the present invention is to provide liberty and easiness for users to control the thickness of the shell.

Yet another object and advantage of the present invention is its ability to create unique texture of the final art piece.

Further details, objects and advantages of the present invention will become apparent through the following descriptions, and will be included and incorporated herein.

For a better understanding of the invention reference is made to the following detailed description of the preferred embodiments thereof which should be taken in conjunction with the prior described drawings.

DETAILED DESCRIPTION OF THE PREFERRED EMBODIMENT

The description that follows is presented to enable one skilled in the art to make and use the present invention, and is provided in the context of a particular application and its requirements. Various modifications to the disclosed embodiments will be apparent to those skilled in the art, and the general principals discussed below may be applied to other embodiments and applications without departing from the scope and spirit of the invention. Therefore, the invention is not intended to be limited to the embodiments disclosed, but the invention is to be given the largest possible scope which is consistent with the principals and features described herein.

Figure 1A:
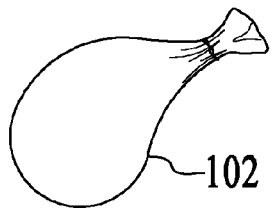
FIGS. 1A-1H are representative views of the manufacturing procedures of a method for creating ornamental structures 100 of the present invention.
Figure 1B:
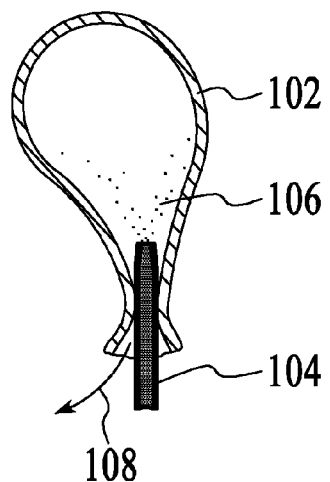
Figure 1C:
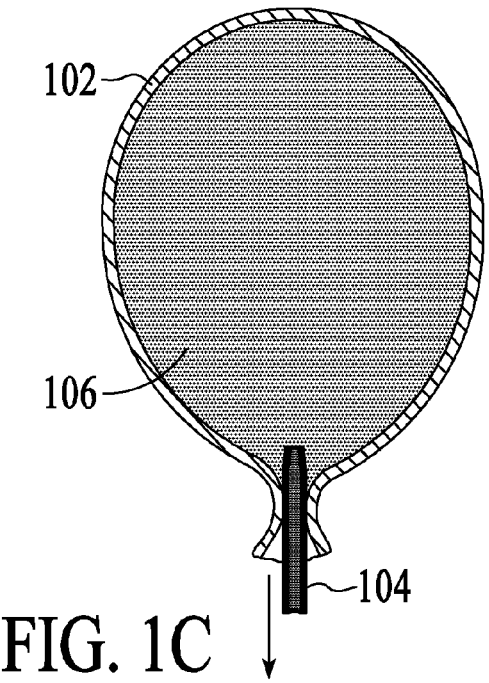
Figure 1D:
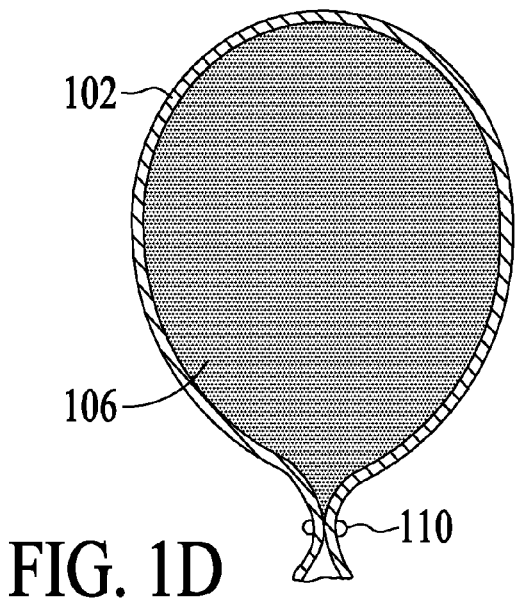

FIGS. 1A-1H are representative views of the manufacturing procedures of a method for creating ornamental structures 100 of the present invention. As shown in 1A, the method 100 commences by selecting a balloon 102 of the desirable inflatable size, shape. In one embodiment, balloon 102 is made of materials that are not capable of sustaining the filler material 106 as it is much heavier than air. As shown in FIG. 1B, a nozzle 104 is inserted in balloon 102 and dispose filler material 106 therein; while air 108 inside the balloon 102 is let out. In one embodiment, disposed filler material 106 will expend in volume and fill the entire capacity within the balloon 102 and continue to expand its size. In one embodiment, filler material 106 is commercially available foam based sealing material which will harden during curing. One example of filler material 106 is Hilti® CF 810 Crack and Joint Pro Insulating Filler Foam. As best shown in FIG. 1C, users will dispose filler material 106 inside balloon 102 until desirable size is attained. Users will be mindful that since filler material 106 is expendable, they should stop disposing filler material 106 just shy of the desirable size of the balloon 102 is attained. As shown in FIG. 1D, once desirable size of balloon 102 is attained, users will retract nozzle 104 and seal the balloon 102 with a clamp 110. The curing process begins and users must wait while filler material 106 harden. Optionally, users can mold the shape of balloon 102 slightly with hand or molding tools. Alternatively, users can also use balloon 102 of different shapes to change the shape of finished art structure 180.

Figure 1E:
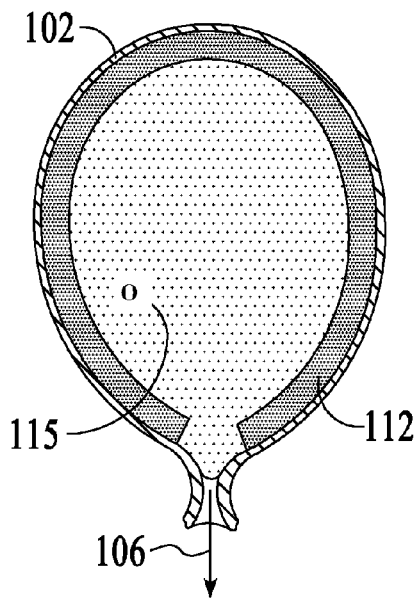

During the curing process, users can periodically check the thickness of hardened shell 112 by poking hole(s) 115 on the balloon 102. As best shown in FIG. 1E, once the desirable thickness of shell 112 is attained, users will dislodge clamp 110 and pour out the still liquefied filler material 106. Alternatively, users can wait until filler material 106 completely solidified and create a solid spherical art piece instead.

Figure 1F:
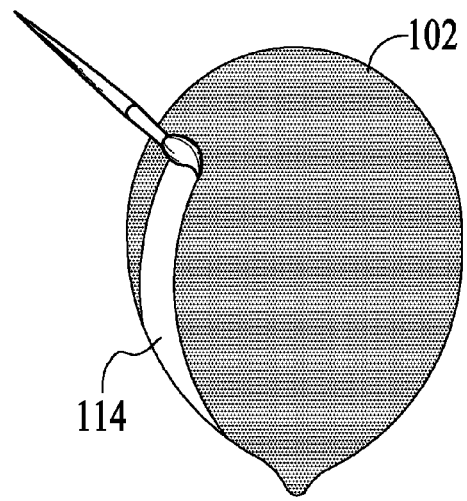
Figure 1G:
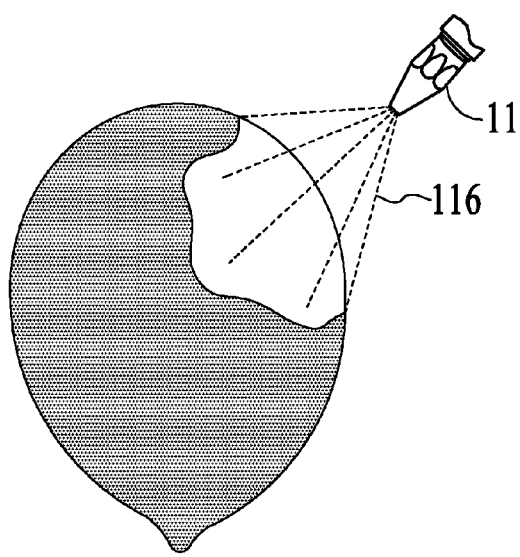
Figure 1H:
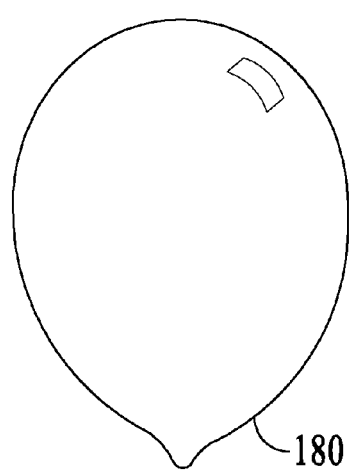

As best shown in FIG. 1F, once shell 112 is completely hardened, users can then apply one or more coat of stucco or plaster 114 directly on the balloon 102. While stucco or plaster 114 is still wet, users can then optionally create surface texture either by hand or tools. After desirable surface texture is created, stucco or plaster 114 will be allowed to air dry until it hardens. Subsequently, as best shown in FIG. 1G, users will decorate stucco or plaster surface 114 with paint 116. Paint 116 can be applied by hand, tools such as a paint brush or spray pen 118. After paint 116 is completely dry, users can optionally apply one or more coats of 2 part resin to make the entire art structure 180 waterproof and scratch proof Paint 116 preferably is acrylic paint.

Figure 2:
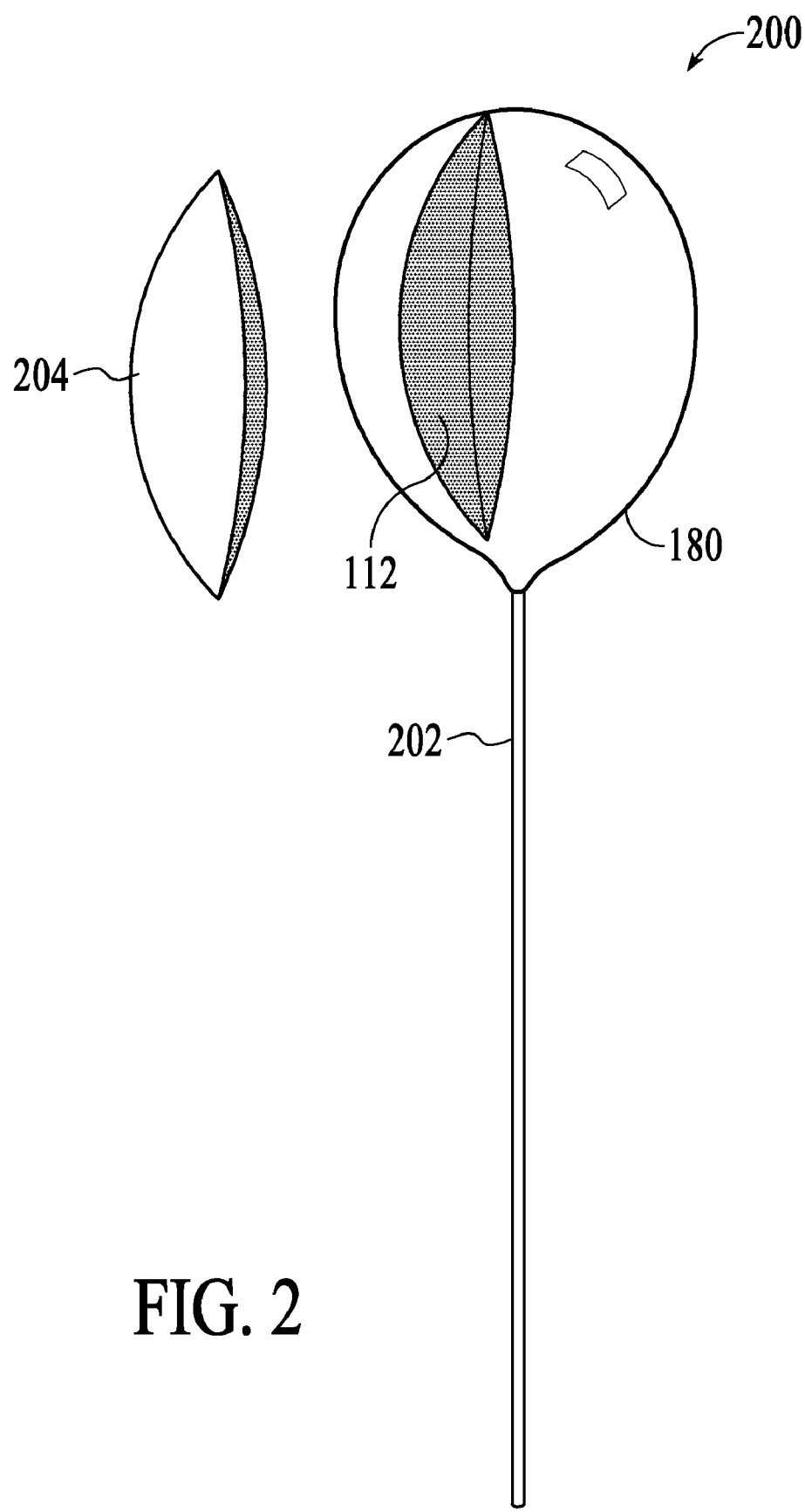
FIG. 2 is a representative isometric view of one alternative treatment of the art ornamental structures 200.

FIG. 2 is a representative isometric view of one alternative treatment of the art ornamental structures 200. As shown in FIG. 2, users can easily convert art structure 180 into a decorative art piece with a hand-held handle 200. As shown in FIG. 2, a stick 202 of any material can be affixed on the art structure 180 as handle, with mechanical or chemical means. To further decorate the decorative art piece with a hand-held handle 200, users can cut into art structure 180 and take out a slice of the shell 204. This decoration technique is especially appropriate when the art structure 180 is decorated as a fruit. Preferably, users should not cut through shell 112 of art structure 180 so as not to expose the hollow cavity 115. Alternatively, users can let filler material 106 completely solidified when creating the art structure 180 for this application.

Figure 3A:
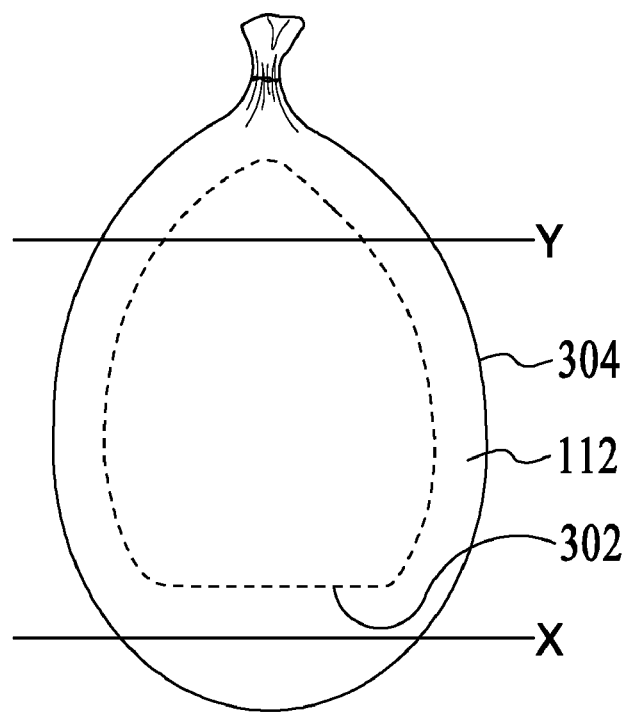
FIG. 3 is a representative isometric view of another alternative treatment of the art ornamental structures 300.
Figure 3B:
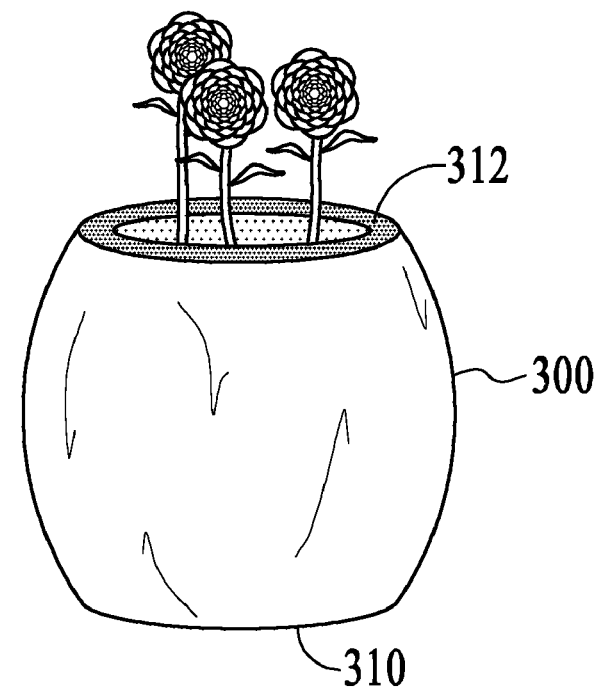

FIGS. 3A and 3B are representative isometric views of another alternative treatment of the art ornamental structures 300. As best shown in FIG. 3A, during curing process, after the desirable thickness of shell 112 is attained, users can empty out most of the liquefied filler material 106 and leave a small amount such that it will form a thicker base 302. When shell 112 including base 302 is completely set, users can apply surface treatment as best described in FIGS. 1F to 1H to form art structure 304. In order to make art structure 304 into a vase or container, users can cut art structure 304 along cutting plane X and Y. Users can then apply coating and paint on base bottom 310 and opening rim 312 to protect the finished product 300.

For a better understanding of the invention reference is made to the following detailed description of the preferred embodiments thereof which should be taken in conjunction with the prior described drawings.

Unless defined otherwise, all technical and scientific terms used herein have the same meaning as commonly understood by one of ordinary skill in the art to which the present invention belongs. Although any methods and materials similar or equivalent to those described can be used in the practice or testing of the present invention, the preferred methods and materials are now described. All publications and patent documents referenced in the present invention are incorporated herein by reference.

While the principles of the invention have been made clear in illustrative embodiments, there will be immediately obvious to those skilled in the art many modifications of structure, arrangement, proportions, the elements, materials, and components used in the practice of the invention, and otherwise, which are particularly adapted to specific environments and operative requirements without departing from those principles. The appended claims are intended to cover and embrace any and all such modifications, with the limits only of the true purview, spirit and scope of the invention.

I claim:

1. A method of creating ornamental structures utilizing a balloon, the method of creating ornamental structures further comprising the step of:
   i. Selecting an inflatable balloon of desirable size, shape and building material;
   ii. Inflating said balloon using an injectable and expandable filler material;
   iii. Monitoring size of the balloon until desirable size is attained;
   iv. Sealing said balloon with a temporary clamping device, letting the filler material begin to harden and set;
   v. Emptying the filler material out when the hardened filler material lining the inside of the balloon has attained a desirable thickness;
   vi. Applying a layer of stucco directly on the outer surface of the balloon, creating surface texture on wet stucco with hands or tools;
   vii. Applying layers of paint on dry stucco surface; and
   viii. Applying layers of resin on dry paint to protect surface.

2. The method of creating ornamental structures of claim 1 in which the filler material is a polyurethane based filler foam.

3. The method of creating ornamental structures of claim 1 further comprises the step of:
   iv-a Poking a hole on the balloon periodically to check the thickness of the hardening filler material lining the inside surface of the balloon.

4. The method of creating ornamental structures of claim 1 further comprises the step of:
   v-a. Cutting a slice off the hardened shell of the balloon to create a unique look.

5. The method of creating ornamental structures of claim 1 further comprises the step of:
   ix. Selecting a pole of desirable length; fastening one end of the pole to the ornamental structures as a handle.

6. A method of creating ornamental container structures utilizing a balloon, the method of creating ornamental container structures further comprising the step of:
   i. Selecting an inflatable balloon of desirable size, shape and building material;
   ii. Inflating said balloon using an injectable and expandable filler material;
   iii. Monitoring size of the balloon until desirable size is attained;
   iv. Sealing said balloon with a temporary clamping device, letting the filler material begin to harden and set;
   v. Pouring most of the filler material out when the hardened filler material lining the inside of the balloon has attained a desirable thickness; leaving a small amount of filler material at the bottom of the balloon to form a base;
   vi. Letting the base dry completely to form an internal horizontal base;
   vii. Cutting horizontally at the top of the balloon to create an opening;
   viii. Cutting horizontally at below the internal horizontal base of the balloon to form a standing base;
   ix. Applying a layer of stucco directly on the outer and inner surface of the balloon, creating surface texture on wet stucco with hands or tools;
   vii. Applying layers of paint on dry stucco surface; and
   viii. Applying layers of resin on dry paint to protect surface.

7. The method of creating ornamental structures of claim 6 in which the filler material is a polyurethane based filler foam.

* * * * *